Nov. 11, 1969  D. G. KOLAND  3,477,086
FLOOR SCRUBBER AND POLISHER APPARATUS
Filed May 9, 1967  2 Sheets-Sheet 2

United States Patent Office 3,477,086
Patented Nov. 11, 1969

3,477,086
FLOOR SCRUBBER AND POLISHER APPARATUS
David G. Koland, St. Paul, Minn., assignor to Whirlpool Corporation, a corporation of Delaware
Filed May 9, 1967, Ser. No. 637,176
Int. Cl. A47l 11/16, 11/08, 11/283
U.S. Cl. 15—320        2 Claims

ABSTRACT OF THE DISCLOSURE

A combination floor scrubber and polisher apparatus adapted to be moved over a floor during use and including a casing capable of receiving and retaining a plurality of liquids in combination with separate liquid conduits for each liquid with a first liquid conduit from the casing being enclosed by a second liquid conduit from the casing and with both conduits being attached at each end to a single mounting means having separate passages therein for each liquid in order that the separate liquids are directed to their respective conduits and both conduits preferably being flexible to permit movement of the liquid containing casing relative to the floor contacting portion of the apparatus.

CROSS REFERENCES TO RELATED DISCLOSURES

Schmitz et al. application Ser. No. 637,178, filed May 9, 1967, which discloses and claims the scrubber and polisher disclosed herein per se, David G. Koland application Ser. No. 637,177, filed May 9, 1967, which discloses and claims liquid dispensing controls including control valves for selectively dispensing each of a plurality of liquids from the scrubber and polisher, Koland et al. application Ser. No. 637,174, filed May 9, 1967, which discloses and claims the structure for providing a plurality of liquids in the apparatus casing and for selectively dispensing these liquids as desired for application to the floor, and Pauler et al. application Ser. No. 504,546, filed Oct. 24, 1965 (now Patent No. 3,344,455), which relates to the motor drive for the brushes, with these applications being assigned to the same assignee as the present application.

SUMMARY OF THE INVENTION

In the above Schmitz et al. application and the Koland application there are disclosed and claimed, as indicated, the apparatus itself and the controls for dispensing the liquids. The present invention relates to the apparatus including a casing adapted to contain a plurality of liquids and separate conduits for each liquid and with one conduit enclosing and hiding another conduit, all conduits are connected at each end to a single mounting means containing separate liquid passages for each conduit. In the preferred structure the liquid containing casing is movably mounted with respect to the floor contacting portion of the apparatus as by being mounted on a movable handle and the various conduits are flexible to permit this movement.

One embodiment of the invention is shown in the accompanying drawings of which:

Figure 1:
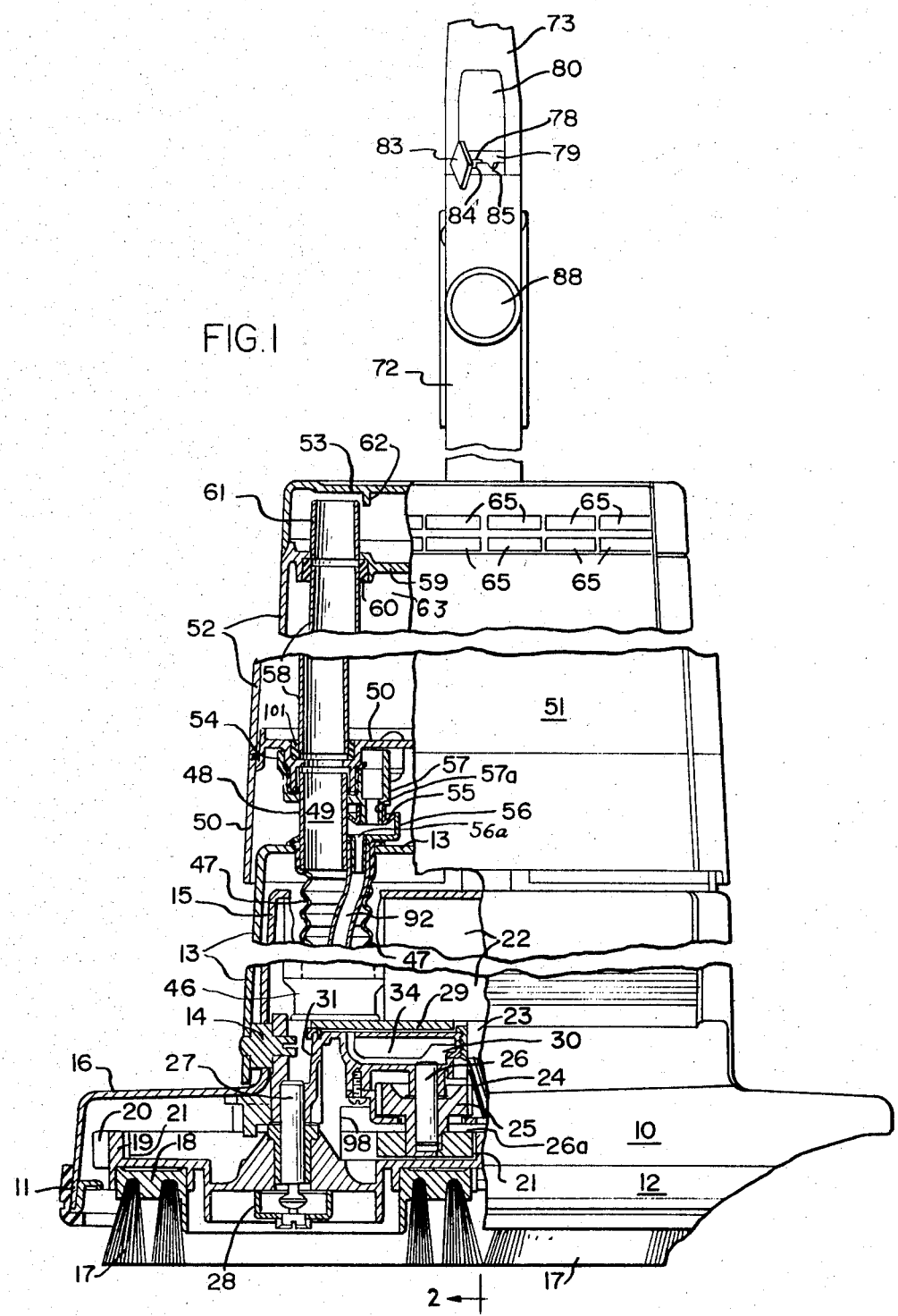
FIGURE 1 is a shortened front elevational view partially in section of a combination floor scrubber and polisher apparatus embodying the invention.

The combination floor scrubber and polisher apparatus shown in the accompanying drawings comprises a housing 10 having an open bottom defined by a peripheral edge 11 around which is extended a bumper strip 12. Rotatably mounted on opposite sides of the housing 10 are the two sides of a maneuvering bail 13 with each side rotatable about a pin 14. The pins 14 are held in the upper part of the housing 10 which constitutes a machinery enclosing hood 15.

Located within the bottom enlarged part 16 of the housing 10 are a pair of rotatable brushes 17 that are circular and arranged side-by-side. The brush bases 18 are each releasably held in a circular mounting 19 each of which is provided on its outer periphery with gear teeth 20 and on its inner periphery with gear teeth 21.

The brushes 17 are driven by an electric motor 22 located within the hood 15. The motor 22 rotates a motor shaft 23 which has an outer helical gear area 24. The gear 24 drives a circular helical gear 25 that is mounted on a pinion shaft 26 for rotation therewith. Keyed to the pinion shaft 26 is a spur gear 26a which engages the inner teeth 21 of one brush mounting 19. The outer gear teeth 20 of each brush mounting are interengaged so the brushes 17 are driven in opposite directions as is explained in greater detail in the above-mentioned Pauler et al. copending application. Each brush 17 is rotatably mounted about a shaft 27 whose bottom is enclosed by a shaft shield 28.

The motor 22 is mounted on a cover 29 for a fan chamber 30 with the cover 29 being supported on a base 31. The top of the fan chamber 30 is defined by the cover 29 and the bottom of the chamber is defined by a wall 32. The wall 32 is provided with a fan inlet opening 33 to the fan 34 that is within the chamber 30. The fan 34 is mounted on the motor shaft 23 for rotation therewith.

Figure 2:
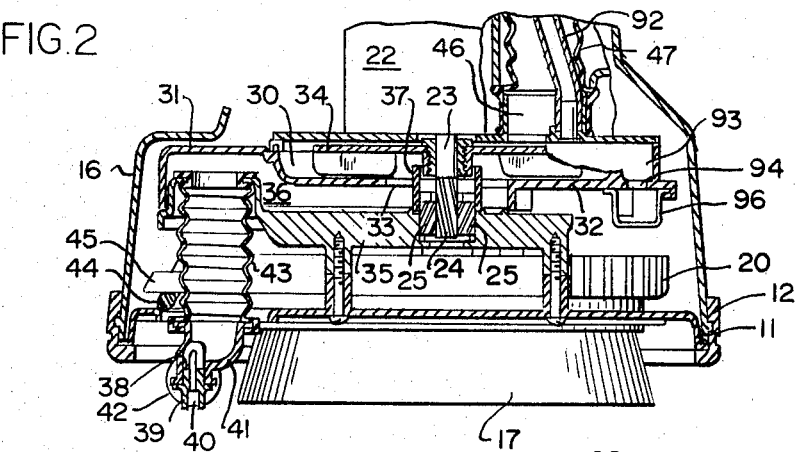
FIGURE 2 is a fragmentary sectional view of the bottom part only of FIGURE 1 taken substantially along line 2 of FIGURE 1.

As can be seen in FIGURE 2, the fan inlet 33 has a bottom cover 35 spaced downwardly therefrom to define a chamber 36. In order to protect the gears the gear area 24 of the motor shaft 23 and the helical gear 25 for driving the pair of brushes are located within a cover 37 at the fan inlet opening 33.

Located at one side of the pair of brushes 17 and within the housing 16 is a vertically movable floor contacting nozzle means that is illustrated as a squeegee nozzle 38. This nozzle 38 has a bottom flexible blade 39 for contact with the floor and it is preferably made of rubber. The blade 39 has an interior opening 40 and is held in a rigid hollow housing 41. The nozzle 38 is supported when in contact with the floor or in lowered position, as shown in FIGURE 2, by end supporting wheels 42.

The upper end of the nozzle housing 41 or the end opposite the bottom blade 39 is connected to an extensible and retractable bellows tube 43 whose upper end is attached to the fan inlet cover 35 to communicate with the chamber 36. In FIGURE 2 the nozzle 38 is shown in lowered floor engaging position. It may be raised from the floor by a lever (not illustrated) such as a foot pedal which raises a lift rod 44. The lift rod 44 raises the nozzle 38 by means of a lift bracket 45.

The nozzle 38 is the floor contacting part of a fluid moving suction means that comprises the rotary fan 34, the fan chamber 30 in which the fan is located and having an inlet 33, recess chamber 36, the bellows tube 43 and the nozzle 38. This fluid moving suction means which has its entrance at the nozzle 38 has an outlet 46 that connects to a tube 47 which is arranged vertically within the hood 15. The upper end of the tube 47 is connected to the lower end of a hollow tube bracket 48 that has a vertical passage 49 therein that receives fluid from the tube 47. The bracket 48 and thus the upper end of the inlet tube 47 are held by the top of the bail 13.

The tube bracket 48 is located within a base 50 for casing 51 that comprises an enclosing casing body 52 closed on its upper end by a top 53.

Located at the upper end of the tube bracket 48 is a valve cover 54. This valve cover 54 is provided with a sealing gasket 55 that extends over a trough 56 formed as a part of the tube bracket 48. The trough 56 is adapted to receive liquid in a manner to be described hereinafter by way of an overlying trough 57 that forms a part of the valve cover 54.

Communicating with the passage 49 in the bracket 48 to receive fluids therefrom is a vertically arranged inlet tube 58 located within the casing body 52 and having its lower end sealed to the base 50 by a gasket 101. The upper end of this tube 58 is sealingly held by a ledge 59 located at the top of the casing body 52. The ledge 59 which has a sealing gasket 60 that supports and seals the upper end of the tube 58 also carries a short vertical tube 61 that is aligned with tube 58 and extends thereabove to receive fluid therefrom.

Extending downwardly from the inner surface of the casing top 53 is a barrier wall 62 that has its bottom below the top of the short top tube 61. Wall 62 changes the direction of air-water flow and thereby aids in separating the water from the air.

At the top of the casing 51 and at the front thereof opposite the short upper tube 61 are provided fluid outlet means in the form of a plurality of openings 65 that are above a baffle 63.

Figure 3:
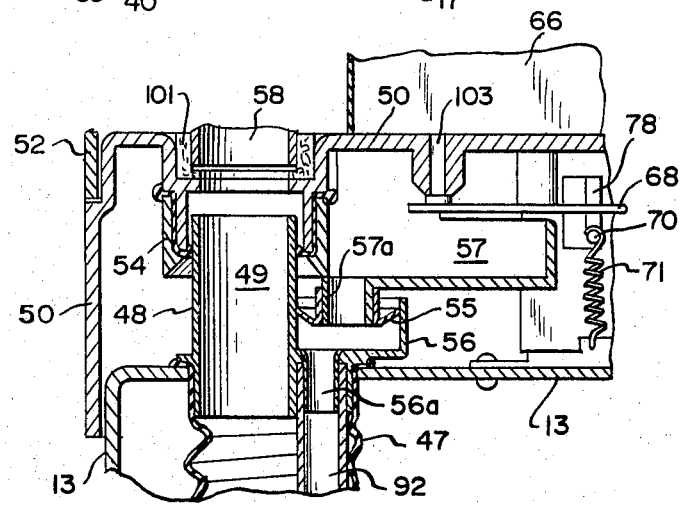
FIGURE 3 is an enlarged fragmentary vertical sectional detail view of a portion of the apparatus of FIGURE 1.
Figure 4:
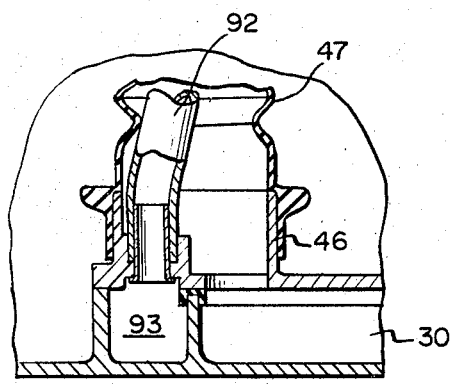
FIGURE 4 is an enlarged fragmentary sectional detail view of another portion of the apparatus.

Located within the container 51 is a source of cleaning liquid such as an aqueous detergent solution and a source of polish liquid. As these and their controls are the subject of the above-mentioned Koland application they will not be described in detail here. However, each of the pair of liquids is contained in a separate collapsible bag one of which is illustrated diagrammatically at 66 in FIGURE 3 with the flow from each of the two bags being controlled by a spring valve illustrated at 68. Each valve is adapted to be selectively opened, as described fully in the copending Koland application, by a longitudinally movable vertical control rod 78 that has a bottom valve engaging projection 70 on its lower end that is adapted to be moved beneath different valves by rotation of the control rod 78 about its vertical longitudinal axis. Then, when the rod 78 is raised against the urging of a retracting spring 71 the particular valve which overlies the projection 70 is opened, as illustrated by the valve 68.

The control rod 78 is positioned within an upwardly extending hollow handle 72 that is provided at its upper end with a hand grip 73.

The outer end of the rod 78 is provided with a knob 83 which may be grasped to move the rod into engagement with either a first notch 84 or a second notch 85 that are laterally spaced apart and formed in the opening 79 in the hinged operating lever 80. When the rod 78 is in one notch 84 the rod is in position to open one valve as illustrated by the valve 68 in FIGURE 3. When the projecting end of the control rod 78 is moved laterally from the position shown in FIGURE 1 to the other notch 85 the rod 78 is in position to open a second valve (not shown). These details are shown more fully in the above-identified Koland application.

At the rear of the upper end of the handle 72 there is located a speed control switch (not shown) operated by a control knob 88 at the front of the handle 72 so that the motor 22 and thus the fan 34 and brushes 17 can be rotated by any of a plurality of preselected speeds desired.

The valves illustrated by valve 68 when opened provide for liquid flow into the trough 57. From this trough the liquid flows down into a lower trough 56 through passage 57a and from there into a liquid dispenser tube 92 through opening 56a. This tube 92 directs liquid through a pair of outlets 98 (only one of which is shown here) which cooperate with brushes 17, as described in the above-identified Schmitz et al. application. Each outlet 98 is adapted to direct the liquid flowing therethrough within the peripheral confines of a brush 17.

The operation of the apparatus is as follows. The motor 22 is energized at the desired speed by the control knob 88 and rotation of the motor rotates the pair of brushes 17 in opposite directions.

Each of the spring valves illustrated by the valve 68 when opened provides for liquid flow therethrough into the trough 57. From this trough the liquid flows down into a lower trough 56 and from there into the liquid dispenser tube 92. This tube 92 comprises a common liquid conduit from all the above described sources of liquid and empties into a first trough 93 that is integral with the base 31. This first trough 93 empties through an aperture 94 into a second trough 96. This second trough has the pair of vertical outlet portions 98 (only one of which is shown).

At the conclusion of the cleaning operation the fan 34 rotated by the rotating motor 22 draws the used cleaning liquid from the floor into the fan chamber 30 by way of the lowered nozzle structure (FIGURE 2) previously described which is disclosed in detail in the above Schmitz et al. application. The fan forces the liquid up the outlet tube 47 by way of the outlet 46 to which the bottom end of this tube is connected. From the upper end of the outlet tube 47 the rotating fan 34 forces the mixture of soiled cleaning liquid and air up through the tube passage 49, through the container inlet tube 58 and out the top of the short upper tube 61. From the top of this tube 61 the used cleaning liquid overflows to fall onto the top surface of the inclined baffle 63. In the meantime the air is separated from the overflowing liquid and escapes into the atmosphere by way of the fluid openings 65.

The casing 51 which now contains the used cleaning liquid forced into the casing by the fan, as described, may be removed in the manner disclosed in the above Koland et al. application.

After the cleaning liquid has been removed from the floor to the desired degree the control rod 78 is arcuately moved about its longitudinal axis by grasping the knob 83 and moving it from the notch 85 to the notch 84, as shown in FIGURE 1. The lever 80 is again rotated to dispense polish liquid from its bag as described in the above Koland application.

As can be seen from the above description, the combined floor scrubber and polisher is a self-contained unit that performs four operations. Thus, it functions as a floor scrubber where the rotating brushes scrub the floor while the cleaning liquid is being dispensed. It also functions to dry the floor as it is used for picking up excess liquid from the floor. Then it functions as a waxer or polish applicator when the rotating brushes spread the liquid polish or wax over the floor. Then, as a fourth operation, the rotating brushes with both liquid valves closed can be used to apply a high gloss to the polish covered floor.

Actual tests have shown that the apparatus of this invention effects a considerable saving in time and energy. Thus in one test the apparatus of this invention required only one and a half hours to scrub and wax a floor 13 feet by 18 feet while to scrub and wax the same floor with conventional equipment required three and a half hours or over twice as long.

Furthermore, tests have proven that there is substantially less interruption of normal floor traffic because with this apparatus the floor can be cleaned and the floor dried immediately by the picking up of the excess liquid. Furthermore, the apparatus is very efficient as the two liquid dispensers including the collapsible bags can be filled at the start of the operation and the floor can be scrubbed, dried, waxed and polished without further delay. In addition, because the liquid is directed into the peripheral confines of the rotating brushes the liquid goes directly to the desired floor areas and there is substantially no spattering. A considerable saving in time and effort is accomplished by using the same brushes for scrubbing, applying polish and buffing. Thus the self-contained apparatus of this invention is a total floor cleaning tool.

The embodiment of the invention in which an exclusive property or privilege is claimed is defined as follows:

1. A combination floor scrubber and polisher apparatus adapted to be moved over a floor during use and having a floor treating section, comprising: a casing capable of receiving and retaining a plurality of liquids; a first liquid conduit extending downwardly from said casing for dispensing floor treating liquid from said casing to said floor; a second liquid conduit extending downwardly from said casing for conducting liquid from said floor upwardly to the interior of said casing, said first conduit being within said second conduit to be concealed thereby; a movable propelling handle means including a bail member beneath said casing; a first single mounting means at the upper end of said conduits for connecting said upper ends to said casing, said first mounting means comprising a short tube bracket attached to the bottom of the casing and to said bail member for mounting said casing on said member; and a second single mounting means at the lower end of said conduits for connecting the lower ends of said conduits to said floor treating section, each said mounting means having separate liquid passage means therein for flow of liquid to and from the separate conduits in separate flow paths.

2. The apparatus of claim 1 wherein there is provided an upwardly extending conduit within said casing for conveying liquid from said floor upwardly to adjacent the top of the casing and said tube bracket contains flow passage means for directing flow of liquid from said second conduit into said passage means.

References Cited
UNITED STATES PATENTS

| | | | |
|---|---|---|---|
| 2,843,866 | 7/1958 | Hancock | 15—321 X |
| 3,020,576 | 2/1962 | Gerber | 15—320 |
| 3,101,505 | 8/1963 | Belicka et al. | 15—320 |

ROBERT W. MICHELL, Primary Examiner